(12) United States Patent
Apvrille et al.

(10) Patent No.: US 8,880,904 B2
(45) Date of Patent: Nov. 4, 2014

(54) SYSTEM AND METHOD FOR SECURING DATA

(75) Inventors: Axelle Apvrille, Roquefort les Pins (FR); Alexandre Frey, Meudon (FR); Christophe Colas, Carrieres sur Seine (FR)

(73) Assignee: Trusted Logic Mobility, Meudon (FR)

( * ) Notice: Subject to any disclaimer, the term of this patent is extended or adjusted under 35 U.S.C. 154(b) by 1332 days.

(21) Appl. No.: 12/442,869

(22) PCT Filed: Sep. 27, 2007

(86) PCT No.: PCT/FR2007/001582
§ 371 (c)(1),
(2), (4) Date: Dec. 23, 2009

(87) PCT Pub. No.: WO2008/037895
PCT Pub. Date: Apr. 3, 2008

(65) Prior Publication Data
US 2011/0162083 A1 Jun. 30, 2011

(30) Foreign Application Priority Data
Sep. 27, 2006 (FR) ..................................... 06 08451

(51) Int. Cl.
*G06F 11/30* (2006.01)
*G06F 21/64* (2013.01)
*G06F 11/14* (2006.01)
*G06F 17/30* (2006.01)

(52) U.S. Cl.
CPC ............ *G06F 21/64* (2013.01); *G06F 11/1441* (2013.01); *G06F 17/30067* (2013.01)
USPC ....................................................... 713/193

(58) Field of Classification Search
CPC ............ G06F 21/6227; G06F 11/1441; G06F 17/30067
USPC .......................................................... 713/193
See application file for complete search history.

(56) References Cited

U.S. PATENT DOCUMENTS

| 5,561,786 | A | * | 10/1996 | Morse | 711/170 |
| 6,947,556 | B1 | * | 9/2005 | Matyas et al. | 380/29 |
| 7,596,570 | B1 | * | 9/2009 | Emigh et al. | 1/1 |
| 2002/0152396 | A1 | * | 10/2002 | Fox et al. | 713/200 |
| 2004/0187006 | A1 | * | 9/2004 | Trapp | 713/176 |

OTHER PUBLICATIONS

Katz, The Performance of Disk Arrays in Shared-Memory DatabaseMachines, 1993, Retrieved from the Internet <URL: springerlink.com/content/m857462286732280/>, pp. 1-32 as printed.*
Shapiro, How to Manage Persistent State in DRM Systems, 2002, Retrieved from the Internet <URL: springerlink.com/content/9h0xrubltc9abegw/>, pp. 1-16 as printed.*

* cited by examiner

*Primary Examiner* — Michael Chao
(74) *Attorney, Agent, or Firm* — Volpe and Koenig, P.C.

(57) ABSTRACT

The invention relates to a system and method for making data secure. The inventive system is characterized in that it comprises:—a monotonic counter;—a computational entity;—a physical data medium comprising one or a plurality of data blocks, a first master block comprising the last value recovered from the monotonic counter, an identifier of the last data block written on said medium, a first authentication code guaranteeing the authenticity of the written data block or blocks, a second authentication code calculated from the last written data block, said data being fixed at a neutral value, and a third authentication code guaranteeing the authenticity of the first master block, and a second master block forming a replica of the first master block; and—an authentication key. The invention is used, in particular, to make data secure against playback and sudden interruptions in service in embedded systems.

24 Claims, 7 Drawing Sheets

SYSTEM AND METHOD FOR SECURING DATA

FIELD OF INVENTION

The invention relates to a system and method for making data stored on a physical medium secure. It relates more particularly to such a system and such a method, wherein the data is made secure against, on the one hand, playback and, on the other hand, impairments or changes caused in particular by sudden interruptions in service.

BACKGROUND

Playback is used to access data fraudulently through the unlawful copying of the prior content of a data management system. For example, if it is assumed that, at a time t0, a system S0 has read rights to a file F, that at the time t subsequent to t0, these rights are consumed with a content of said system equal to S, then playback allows fraudulent access to the read file F at the time t by copying the content of the system S0 in the system S to obtain a system containing S0 acknowledged as valid at the time t.

Conventionally, data in prior art systems is protected against playback by sending random events that change with every session, a time-stamp, or else, monotonic counters.

Sudden interruptions in service may impair the data contained in a physical medium for example when said data is read or written. These sudden interruptions in service are generally caused by the data management system being suddenly blacked out, mainly in the event of an electricity power cut or in the event of said system being inadvertently rebooted. Impairment to the written or read data may furthermore be caused by acts of aggression, when a malefactor intentionally alters the read or write behaviour in the data management system, or else, in the event of accidental errors occurring, in particular, following damage to the hard disk read-head or to the mechanism causing it to move.

Conventionally, the data in prior art systems is protected against sudden interruptions in service by providing for said data to be backed up and allowing the backed up data to be recovered. For example, when the data medium is a hard disk, this disk is mounted in a RAID (Redundant Array of Independent Disks) using one or more additional disks. The arrangement of disks in RAID 1 will be cited in particular.

However, to combine, on the one hand, data recovery further to impairments caused by sudden interruptions in service with, on the other hand, protection of said data against playback, is no easy matter. Indeed, in respect of data recovery, it is wished to retrieve data that has been subject to impairment, whereas, in preventing playback, the aim is to prevent any retrieval of said data. Combining a backup system for a partition containing data with protection for said partition against playback that includes monotonic counters therefore seems incompatible. In the opposite situation, recovering an old saved partition would be in contradiction to the anti-playback protection system since it would use a prior value of the monotonic counter.

Given the prior art disclosed above, a problem to which the invention offers a solution is the implementation of a system and a method for making data secure against, on the one hand, playback and, on the other hand, data changes due in particular to a last interruption in service.

SUMMARY

The prime object of the solution proposed by the invention to this problem as posed is a system for making data secure, characterized in that it comprises:

a monotonic counter;
a computational entity;
a physical data medium comprising
one or a plurality of secure data blocks,
a first master block comprising the last value recovered from the monotonic counter, an identifier of the last data block written on said medium, a first authentication code guaranteeing the authenticity of the written data block or blocks, a second authentication code calculated from the last written data block, said data being fixed at a neutral value, and a third authentication code guaranteeing the authenticity of the first master block, and
a second master block forming a replica of the first master block; and
an authentication key.

The second object is a method for making data secure, characterized in that it comprises the following steps of:
providing a monotonic counter, a computational entity, a physical data medium and an authentication key; and of
writing, on said data medium, one or a plurality of data blocks, a first master block comprising the last value recovered from the monotonic counter, an identifier of the last data block written on said medium, a first authentication code guaranteeing the authenticity of the written data block or blocks, a second authentication code calculated from the last written data block, said data being fixed at a neutral value, and a third authentication code guaranteeing the authenticity of the first master block, and a second master block forming a replica of the first master block.

BRIEF DESCRIPTION OF THE DRAWINGS

The invention will be better understood from reading the following non-restrictive description, and in relation to the appended drawings, wherein.

DETAILED DESCRIPTION OF THE PREFERRED EMBODIMENTS

In the present invention, any datum is deemed to be authentic if it is allowed to guarantee that said datum has not been unlawfully changed or replaced by a third party. The datum is authenticated in particular by a cryptographic algorithm which gives an encrypted datum known as MAC (Message Authentication Code). Such an algorithm uses a secret key and operates on a datum for protection. It can only be verified by providing the appropriate secret key. It produces a generally short authentication code, which guarantees the origin and integrity of the datum. A single alteration to the datum and the code changes.

The invention relates to a system 10 for making data secure. In one example, said system is a system embedded in a device of the mobile telephone type, comprising in particular a casing fitted with a keypad, a screen, a microphone, a loudspeaker, an electronic card, a data transmission and reception module, a subscriber identification module (SIM) and a battery providing electrical power. The electronic card comprises at least one microcontroller, a RAM memory, a flash memory, and a bus system. Telephone operation is managed by an operating system and a set of applications loaded for example into a memory of said telephone.

Figure 1A:
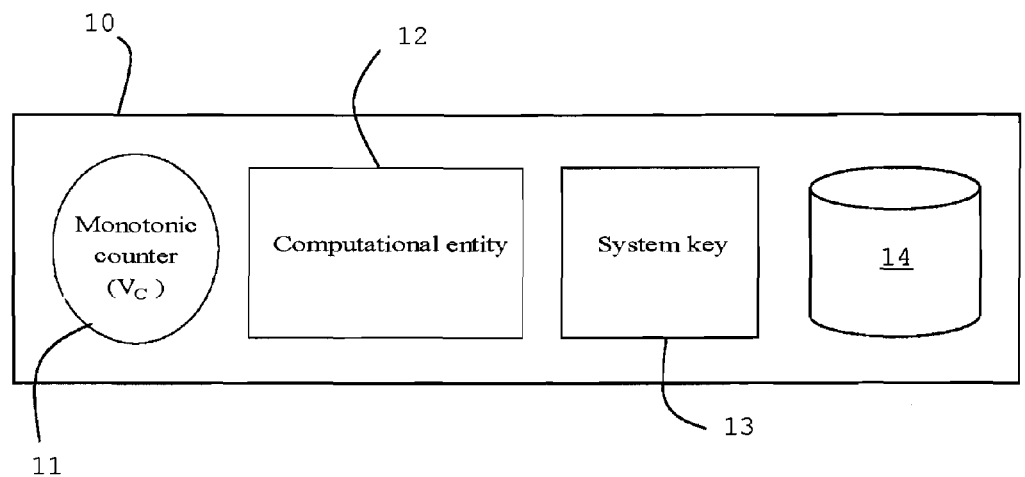
FIG. 1A shows, diagrammatically, the different components of a system according to the invention.

As is shown in FIG. 1A, the inventive system comprises a monotonic counter 11, a computational entity 12, a system key 13 and a physical data medium 14.

The system 10 is particularly a partition management system or a file management system.

The monotonic counter 11 is a counter which can only be incremented by a single unit. The current value $V_C$ of this counter can be recovered. It will however be noted that recovering this current value does not increment the counter 11. The counter 11 is thus able to respond to a first incrementation instruction and to a second instruction, different from the first instruction, for the recovery of its current value. It will be noted that the current value of the monotonic counter 11 is, according to one preferential embodiment of the invention, stored encrypted in this counter. In this event, this value can only be recovered by a duly authenticated entity of the system.

The computational entity 12 is a physical entity or a logic entity. When a physical entity is involved, this is for example a microprocessor or a microcontroller possibly dedicated to computational applications such as a crypto-processor. When a logic entity is involved, this is for example a piece of software capable of making computations on a generic processor. This is the entity 12 which calculates in particular the MAC, or the other encryptions and decryptions, as well as the verifications required according to the present invention. This entity may possibly use system resources that have not been shown such as random access memory resources. According to a preferential embodiment of the invention, the computational entity 12 calculates MACs on arrays of one or more data blocks. It saves the results of these computations in a random access memory. The authentication codes Auth_A and Auth_B equate to an MAC of these results. To be more precise, it is an MAC of a set of MACs of the $1^{st}$ data block array concatenated with an MAC of the $2^{nd}$ data block array, etc . . . , until all the arrays are taken into account. The computational entity 12 therefore uses the aforementioned results to calculate the MACs of the authentication codes Auth_A and Auth_B, the size of the arrays being noted in the master block.

The system key 13 is a cryptographic key that can only be accessed by entities authorized by the system 10. Typically, it can only be accessed from this system.

The physical data medium 14 is a medium for the persistent storage of computer data. It may for example be a hard disk, a flash memory, or even removable disks of the diskette type.

Figure 1B:
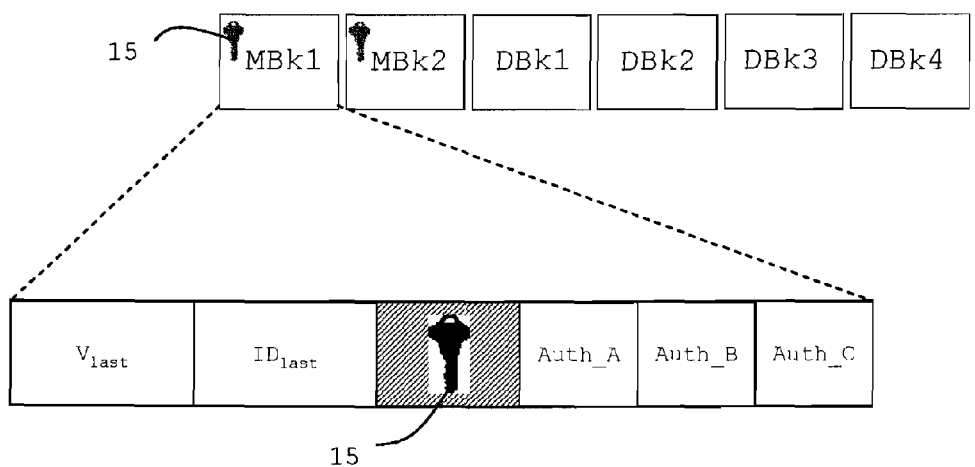
FIG. 1B shows, diagrammatically, a set of data blocks recorded on a physical medium, and two master blocks associated with said data, so that they can be made secure according to the invention.

As is shown in FIG. 1B, the medium 14 comprises one or a plurality of contiguous data blocks DBk and two contiguous master blocks, a first MBk1 and a second MBk2 master block, said master blocks being associated with said data blocks and contiguous thereto, the master block MBk2 being a replica of master block MBk1. In other words, the master blocks MBk1 and MBk2 are normally equal. However, they may be different particularly in the event of a write error due for example to an interruption in service, or else, in the event of an attack on one of said blocks.

The size of the data blocks DBk is configurable. It is 256 bytes for example. There may be any number of data blocks containing data made secure in accordance with the invention. In the example in FIG. 1B, four blocks DBk1, DBk2, DBk3 and DBk4 have been shown.

The master blocks MBk1 and MBk2 are of sufficient minimum size to contain the data fields which will be described in the remainder of the present disclosure of the invention. In practice, this minimum size is about 100 bytes.

Each master block MBk comprises the following fields: the last recovered (or returned) value $V_{last}$ of the monotonic counter 11, the identifier $ID_{last}$ of the last data block DBk written on the data medium 14, an authentication key 15 encrypted by the system key 13, an authentication code Auth_A guaranteeing the authenticity and integrity of the data blocks DBk1 through to DBk4, an authentication code Auth_B calculated from the last written data block with the data thereof being fixed at a neutral value, said neutral value being for example equal to a sequence of zeros, and from the data in the other data blocks, which is saved as it is, and an authentication code Auth_C guaranteeing the authenticity and integrity of the master block MBk in other words, to be more exact, the authenticity and integrity of said master block MBk, with the field Auth_C thereof being fixed at a neutral value. Indeed, Auth_C is calculated from the master block MBk with the field Auth_C thereof being fixed at a neutral value, typically a sequence of zeros. When Auth_C is calculated, its value is entered in the master block MBk. Additionally, each master block MBk possibly comprises other information relating for example to its size, or its number of sectors, said information not being shown in FIG. 1B.

According to the invention, the data blocks DBk may be encrypted by an encryption key. Some MAC computations, made by the computational entity 12, are then implemented on encrypted data blocks. The encryption key may be stored in the master blocks, or else, directly on the system itself. It may alternatively be encrypted by the system key. In this event, only the system key is on the system.

The data blocks DBk are not changed and the master blocks MBk are not interleaved between said data blocks DBk. It is thus possible to read the data in the data blocks DBk directly.

Figure 2:
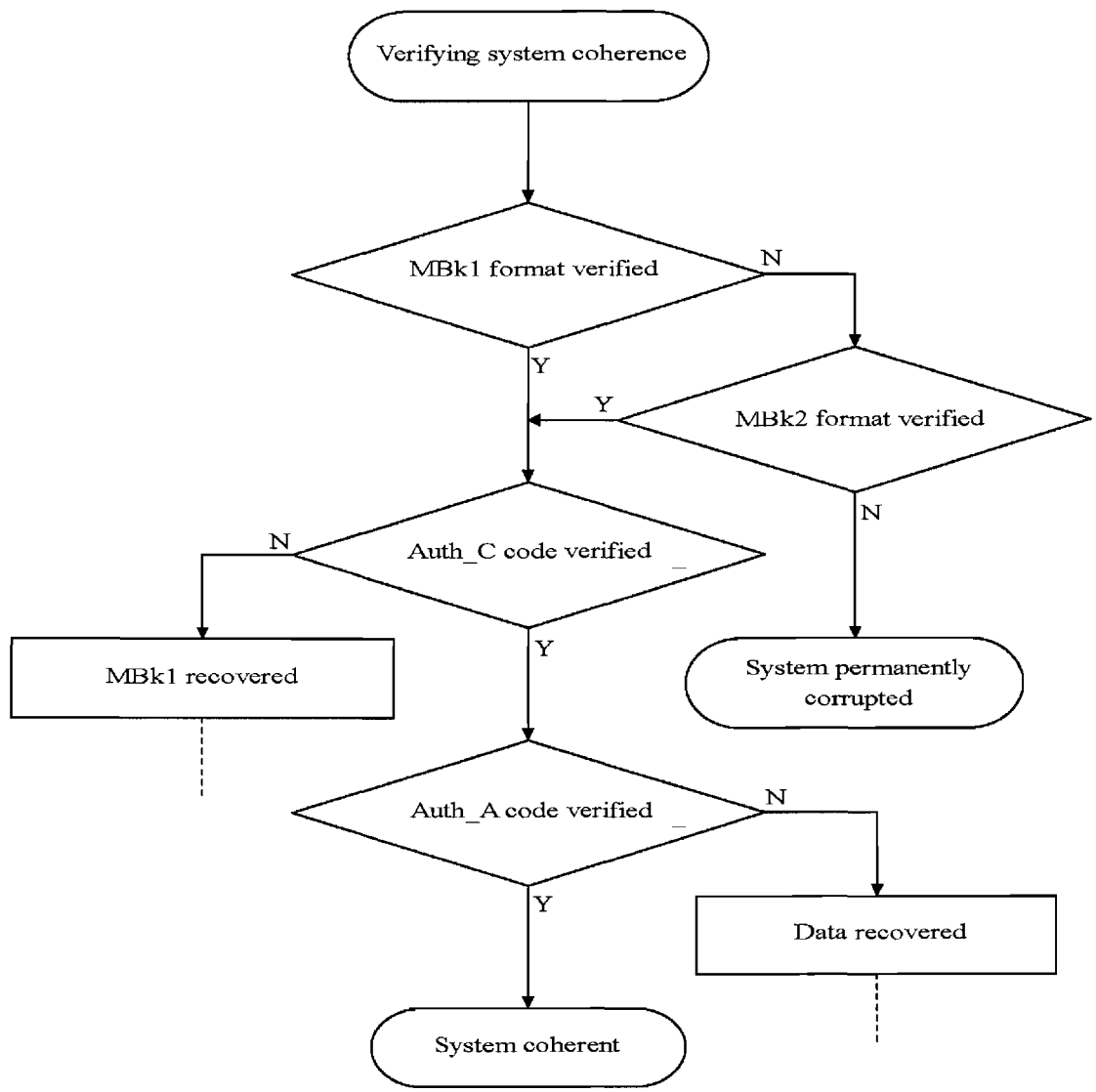
FIG. 2 shows the different steps leading to the verification of the coherence of a system according to the invention, when said system is started up.

The coherence of the inventive system is verified when it is started up. As is shown in FIG. 2, to verify the coherence of the inventive system, the format of the first master block MBk1 is verified first of all. This format verification comprises for example steps of verifying the legality of the identifier $ID_{last}$, the last returned value $V_{last}$ of the monotonic counter 11, the presence of the authentication codes Auth_A, Auth_B and Auth_C and the presence of the authentication key 15 encrypted by the system key 13. In the event of the format of the first master block MBk1 being unlawful, the format of the second master block MBk2 is verified. In the event of the format of the second master block MBk2 being unlawful, the system is deemed to be permanently corrupted, the data not being secure, said system having for example sustained an attack. An alarm may then appear to the system user and data access is conventionally forbidden. Conversely, in the event of the format of the second master block MBk2 being lawful, the first master block MBk1 is replaced by the second master block MBk2.

Figure 4A:
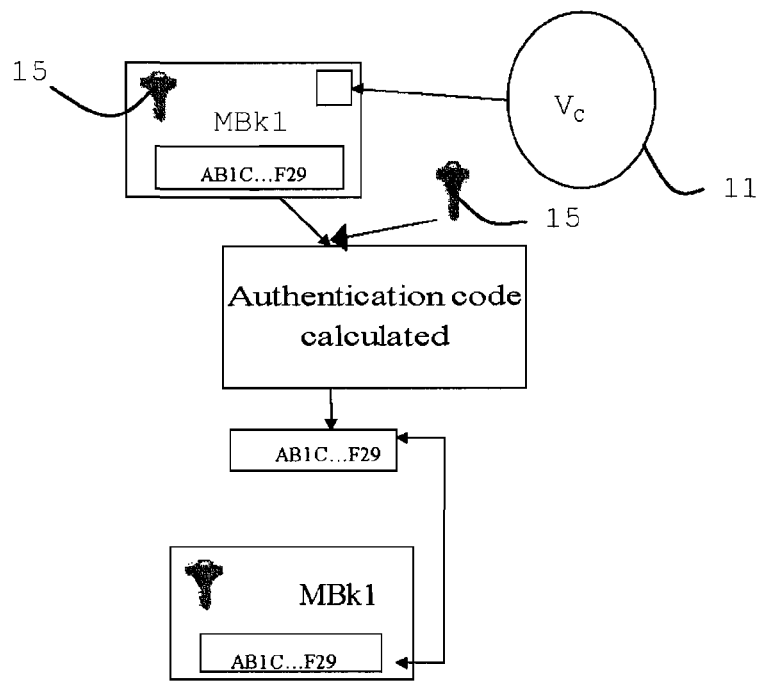
FIG. 4A shows, diagrammatically, the steps leading to the verification of a master block authentication code according to the invention.

When the format of the block MBk1 is lawful or when the format of the block MBk1 is unlawful but the format of the block MBk2 is lawful and when, as has been indicated previously, the block MBk1 has been replaced by the block MBk2, the authentication code C is verified, in accordance with a subsequent step in the inventive method. This verification, shown in diagrammatic form in FIG. 4A, involves calling upon the cryptographic function MAC by providing it, on the one hand, with the authentication key 15 decrypted using the system key 13 and, on the other hand, with the content of the master block MBk1 whereof the monotonic counter value field is updated by the current value $V_C$ contained in this counter 11. The result obtained is then compared with the authentication code Auth_C of the master block MBk1. If this result is identical to the authentication code Auth_C of the block MK1, then the block MBk1 is authentic. In the contrary event, it is not deemed to be authentic and the master block recovery procedure is triggered (FIG. 2).

If the master block MBk1 is authentic, the authentication code Auth_A is then verified, in accordance with another step in the inventive method. This verification also invokes an MAC which is calculated on all the data contained in the data blocks DBk in the system, possibly encrypted. To advantage, this MAC may be calculated, initially, in respect of data block arrays and then, secondly, in respect of the authentication codes so calculated of the data arrays. In the event of the verification of the code Auth_A being correct, the system is deemed to be coherent. In the contrary event, the data recovery procedure is triggered.

After system coherence has been verified, in respect of writing new data in the system, the inventive procedure continues as follows.

Figure 3:
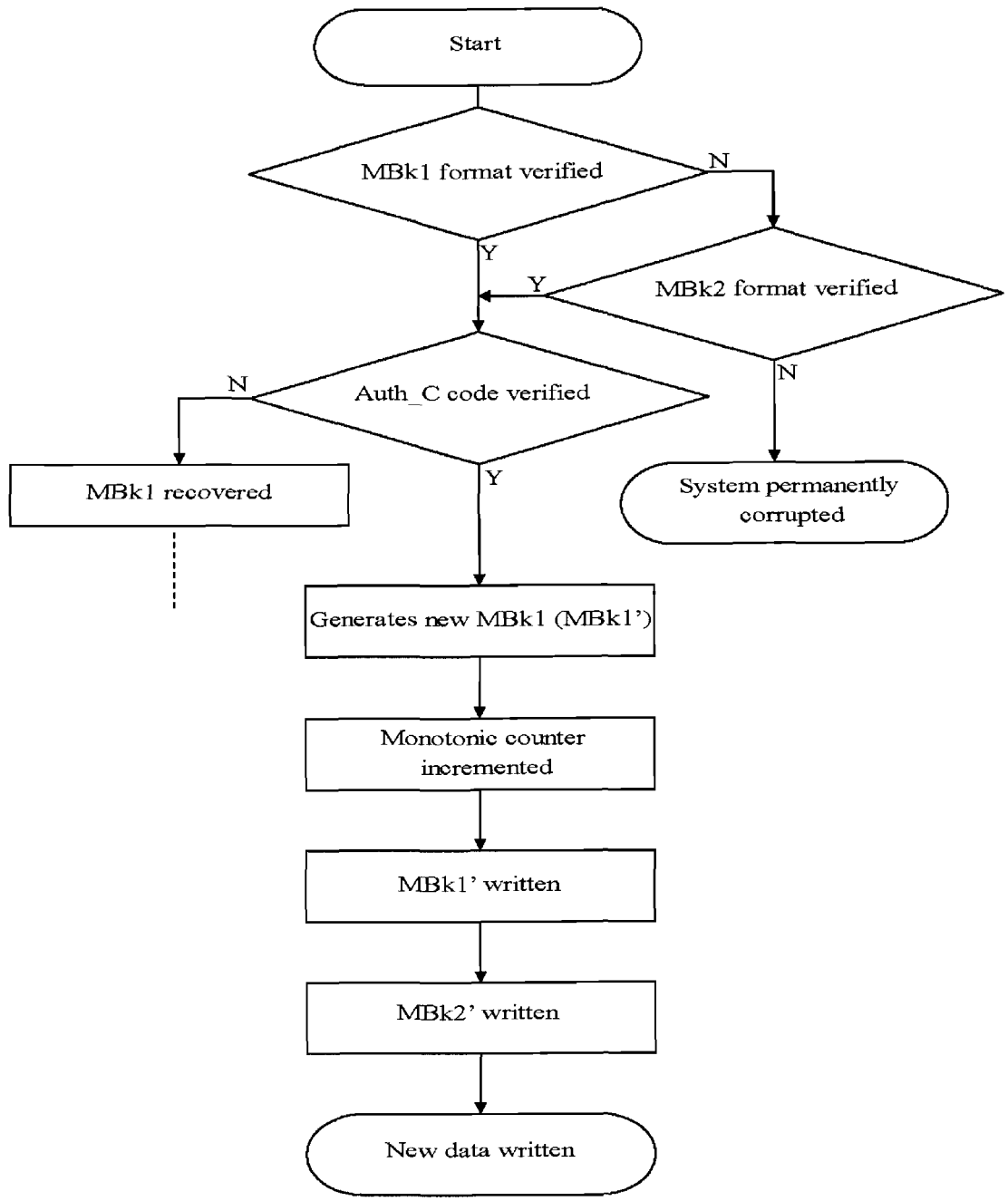
FIG. 3 shows the different steps leading to the writing of new data on the physical medium of the system according to the invention.

First of all, as has been shown in FIG. 3, the format of the block MBk1 and, where appropriate, of the block MBk2, is verified in the way described previously for verifying system coherence. Just as previously, if these verifications fail, then the system is permanently corrupted.

Then, in a subsequent step, the code Auth_C is verified. Just as previously, if this code is not verified, the master block recovery procedure is launched. Conversely, if this code is verified, then the block MBk1 is authentic and a new master block MBk1' is generated, without the code Auth_A being verified. Indeed, it is assumed that, while the system is running, third party malefactors will not interact with this system.

Figure 4B:
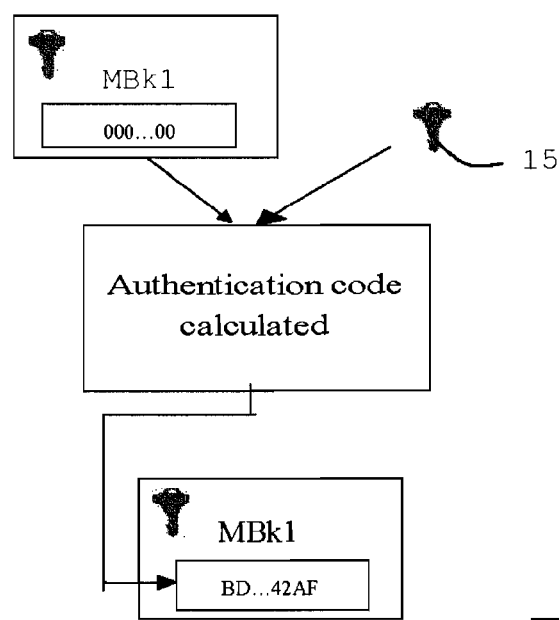
FIG. 4B shows, diagrammatically, the steps leading to the computation of a master block authentication code according to the invention.

To generate the new master block MBk1', the following steps are implemented. First of all, the identifier $ID_{last}$ of the last written data block is updated. Then, the current value $V_C$ of the monotonic counter 11 is recovered and the value $V_C+1$ is written in the new master block MBk1'. Any other information there may be in the master block is then updated. In the new master block MBk1', a pre-specified value, for example a sequence of zeros, is then calculated, at the point provided for the authentication codes Auth_A and Auth_B, and the master block MBk1' is updated. Lastly the new authentication code Auth_C is calculated and the corresponding value is then noted in the master block MBk1'. The steps in this computation are set out diagrammatically in FIG. 4B. It is made on the basis of the new master block so constituted, in other words with, in particular, the new data identifier, the monotonic counter value equal to $V_C+1$, and the authentication codes A and B of the new data.

Once and only once the new master block MBk1' has been generated, the monotonic counter value is incremented to $V_C+1$, and then the master block MBk1' is written into the system, the second master block MBk2', which is a duplication of the master block MBk1 is also written and, finally, the new data is written.

Figure 5:
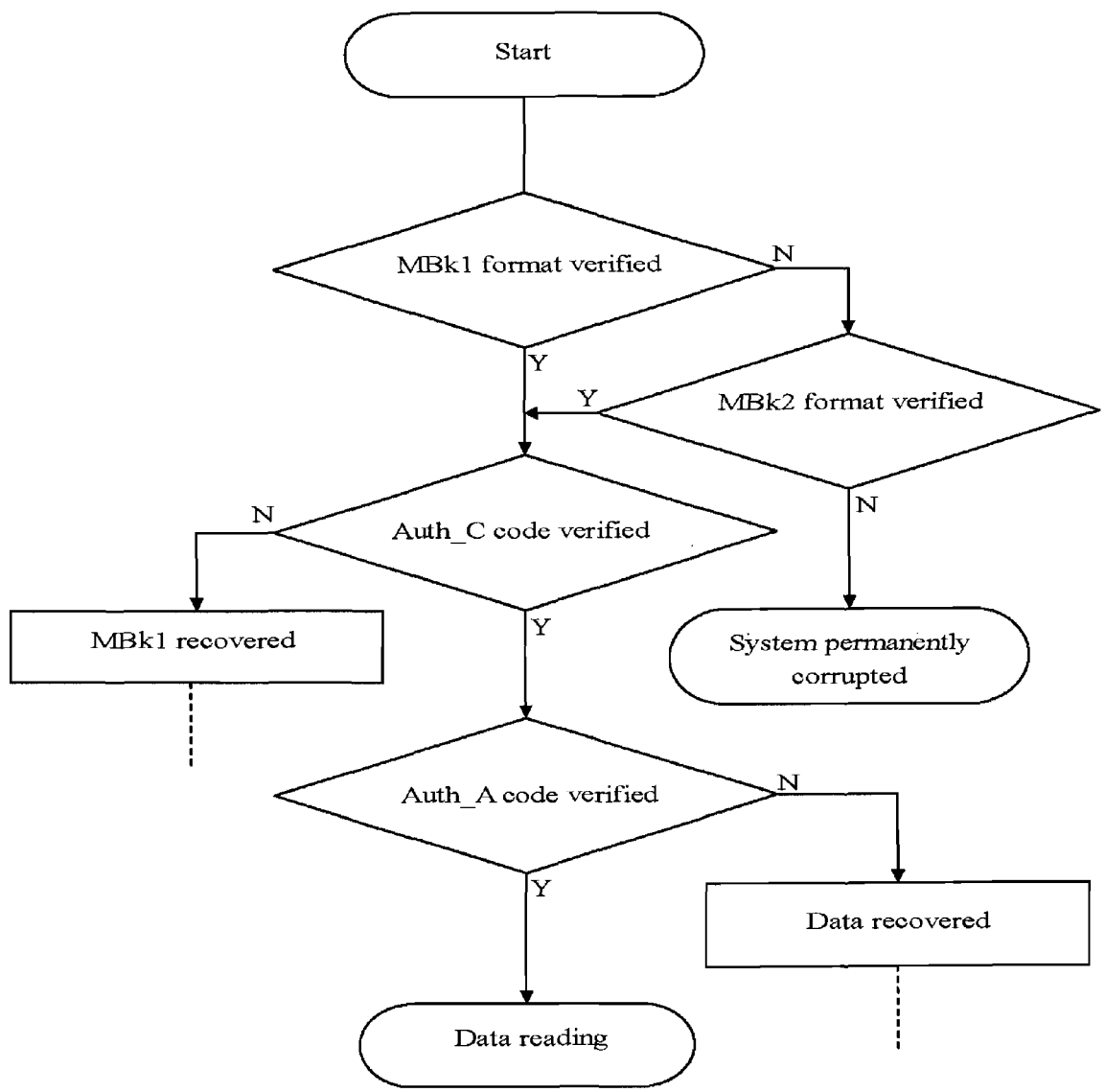
FIG. 5 shows the different steps leading to the reading of the written data on a data medium of a system according to the invention.

To read the data, as has been shown in FIG. 5, the procedure is as follows. Just as previously, the format of the master block MBk1 is verified. If it is unlawful, the format of the master block MBk2 is verified. If this second verification fails, the system is deemed to be permanently corrupted.

Conversely, in the event of the verification of the format of one of the master blocks MBk1 or MBk2 being completed successfully, the next steps in the procedure are taken. First of all, the code Auth_C is verified using the current value $V_C$ of the monotonic counter 11. In the event of the master block MBk1 not being authentic, the master block recovery procedure is launched. In the contrary event, the code Auth_A is verified. If this verification fails, the data recovery procedure is launched. In the contrary event, the data corresponding to the data identifier supplied is read. Optionally, if the encryption is activated, the data is read and then it is decrypted and the decrypted data is returned.

Figure 6:
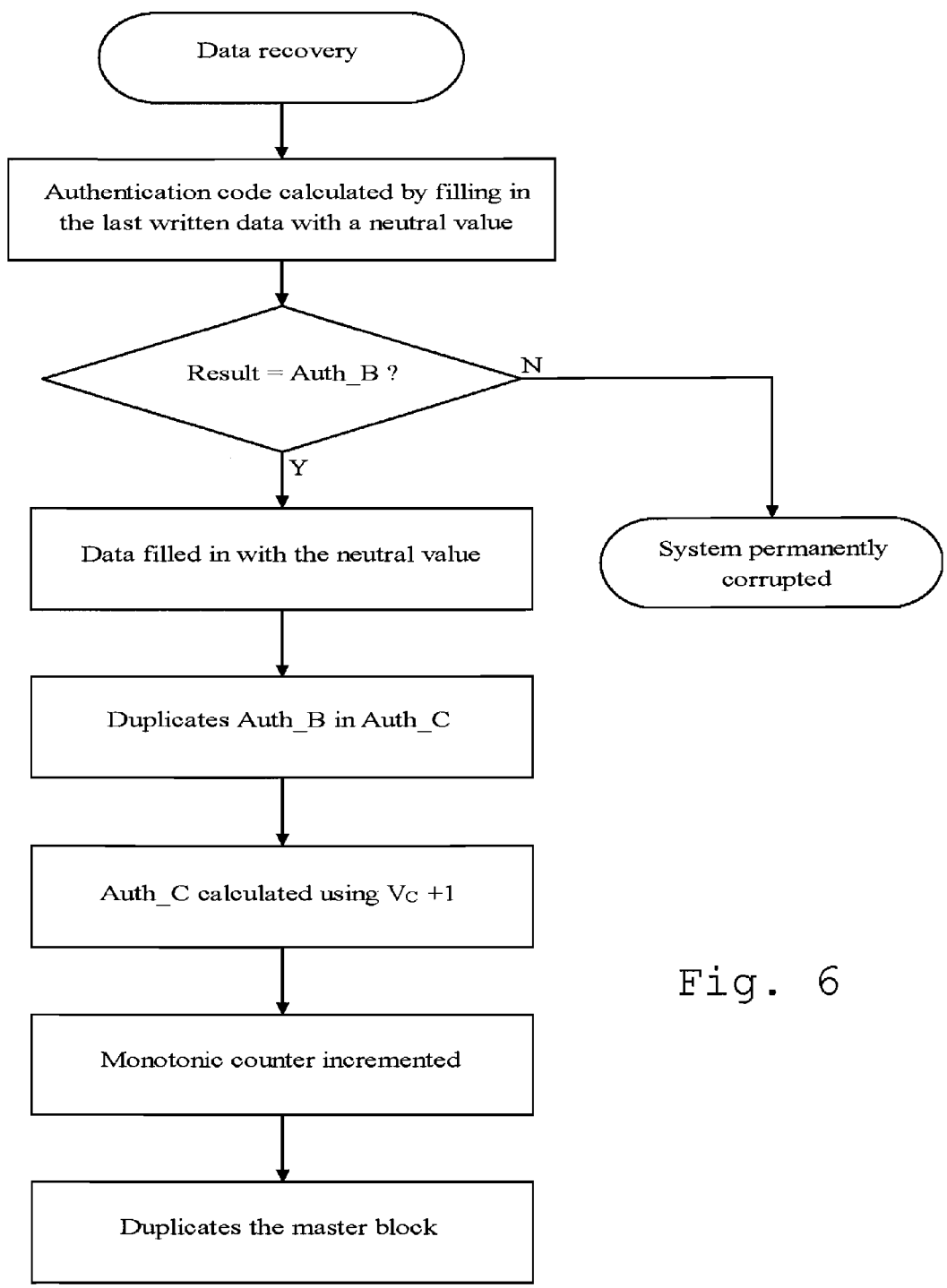
FIG. 6 shows the different steps in a data recovery procedure according to the invention.

The data recovery system is shown in FIG. 6. This procedure is performed automatically, without it being necessary to reboot the system. It comprises the following steps. First of all, an authentication code is calculated by filling in the last written data with a pre-specified neutral value, for example a sequence of zeros. This last written data is identified by an identifier noted in the master block.

If the result of the aforementioned computation is equal to the authentication code Auth_B, then the procedure is as follows. First of all, the data is actually filled in with the neutral value. Then, the authentication code Auth_B is duplicated in the code Auth_A. The code Auth_C so changed is calculated once again using the current value of the monotonic counter $V_C+1$, said computation being carried out on a master block MBk with the position therein of the master block authentication code being previously filled with the neutral value. Finally the monotonic counter is incremented, and the master block is duplicated.

If the result of the aforementioned computation is not equal to the authentication code Auth_B, the data system must be deemed to be permanently corrupted.

Figure 7:
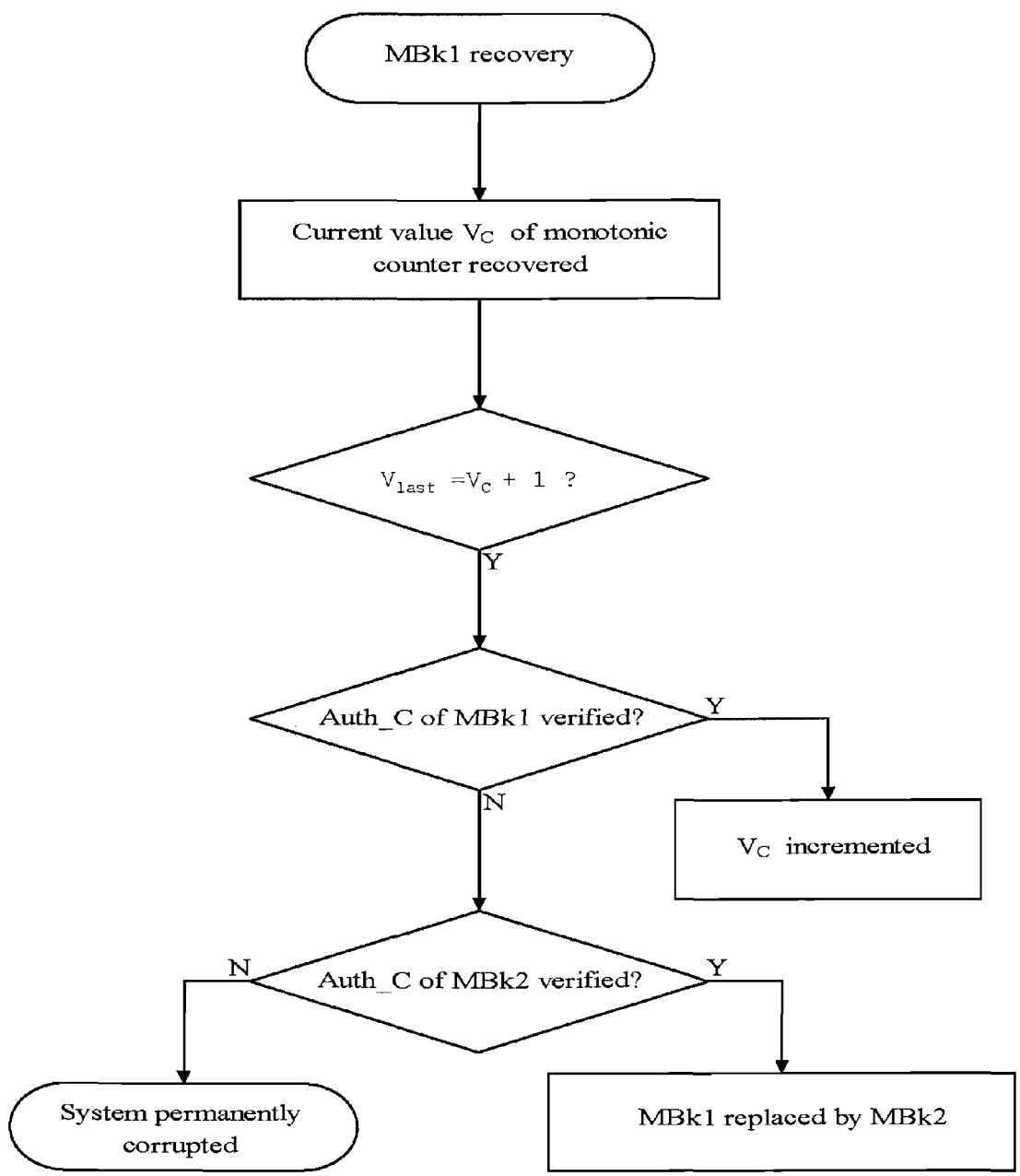
FIG. 7 shows the different steps in a master block recovery system according to the invention.

The automatic recovery procedure for a master block is shown in FIG. 7. It is activated when the code Auth_C indicates that the master block MBk is not authentic. This procedure is implemented in the following way. First of all, the current value of the monotonic counter $V_C$ is recovered. If the monotonic counter value indicated in the master block is equal to the value $V_C+1$, the authentication code C is verified assuming that the monotonic counter value is equal to the current value $V_C+1$.

If this verification is completed successfully, the value $V_C$ of the monotonic counter 11 is incremented. In practice, this situation arises when there is a sudden interruption in writing just before the monotonic counter 11 is incremented.

Conversely, if this verification is not completed successfully, the code Auth_C of the second block MBk2 is verified. In the event of this final verification being completed successfully, the block MBk1 is then replaced with the block MBk2. In the contrary event, the system is corrupted and non-recoverable.

Generally speaking, it will be noted that, in the event of the data blocks being encrypted by an encryption key contained in the master blocks, data block writing is preceded by a step of encrypting said data. For reading, said blocks are also previously decrypted. The data recovery system is also slightly changed since the authentication code Auth_A is specified from encrypted data. The same is true for the authentication code Auth_B which is specified from a last block containing encrypted neutral values.

As has been explained in the implementation examples hereinafter, the inventive system is playback resistant.

Let us assume that the system comprises two authentic master blocks MBk1 and MBk2, content data DBk, with a monotonic counter current value equal to $V_C$. Later, the system is changed, with authentic master blocks MBk1' and MBk2', content data DBk' and a monotonic counter value equal to $V_C$+1.

If an aggressor replaces the data DBk' with the data DBk, and the master blocks MBk1' and MBk2' with the blocks MBk1 and MBk2, respectively, the verification of the authentication code C of the blocks MBk1 and MBk2 then fails since these blocks have been calculated with the value $V_C$ whereas the present current value of the monotonic counter is $V_C$+1.

If an aggressor only replaces the data DBk' with the data DBk, but saves the master blocks MBk1' and MBk2', then the block MBk1' is authentic but the authentication code Auth_A of this data is not since it relates to the data DBk' whereas this block is now associated with the data DBk. If the changes made by the aggressor relate to the last written data block, a system recovery will then occur and the last data block will be filled with the neutral value.

Finally, if an aggressor replaces the data DBk' with data for example DBk and forges a master block DBk1" identical to the master block MBk1' except that it indicates a monotonic counter value $V_{last}$ equal to $V_C$ and not $V_C$+1, the authentication code Auth_C of the master block MBk1' will not be valid since the current value of the monotonic counter is $V_C$+1.

Likewise, and as is explained in the implementation examples hereinafter, the inventive system is resistant to changes in particular those due to sudden interruptions in service such as system restart or a cut in the electricity supply.

Let us assume that the inventive system comprises two master blocks MBk1 and MBk2, data DBk and a monotonic counter value equal to $V_C$.

If it is wished to write new data DBk' but an electrical power cut occurs after the master block is written and before the monotonic counter is incremented, the system is then in a state such that it comprises a master block MBk1', a master block MBk2, data DBk and a monotonic counter value at a value $V_C$. The verification of the authentication code Auth_C of the block MBk1' then fails because it has been calculated with a counter value at $V_C$+1 whereas the current value is $V_C$. The master block recovery procedure is then activated. It happens that the counter value noted in MBk1' is in fact the current value+1. The master block MBk1' is then verified assuming that the counter is equal to the current value+1, which works. The monotonic counter is then incremented and the system is again coherent.

If, just as previously, it is wished to write new data DBk' and an electrical power cut occurs just after the monotonic counter is incremented, a system is then obtained with master blocks MBk1', MBk2, DBk and a counter value equal to $V_C$+1. The verification of the authentication code C of MBk1' succeeds because the counter is at $V_C$+1. However, the verification of the authentication code A fails because the data DBk' is expected and not DBk. The data recovery procedure is then activated. The authentication code B is verified using neutral values for the last written data block. This appears to correspond to DBk. The verification therefore succeeds. The system is finally reset in a correct state using neutral values in the last written block and by correcting the master block. The system is, in this example too, again coherent.

It will be noted that, if the cut in the electricity supply to the system occurs after the second master block is written, the processing is identical to the previous situation.

It will finally be noted that, if the cut in the electricity supply to the system occurs after the last data block has been written, the system is then in a coherent state and no correction needs to be made.

When all is said and done, the last written datum can be recovered according to the invention by using the following three mechanisms.

Firstly, writing strictly follows the following four successive steps: calculating and writing the master block using the current value of the monotonic counter+1; incrementing the value of the monotonic counter; writing the second master block; and writing the last data block.

Secondly, the master block contains an authentication code Auth_B and the identifier of the last written data block.

Thirdly, the master block is itself duplicated in the event of the error occurring at the very moment the master block is written.

The inventive system, as disclosed in the embodiment above, can be used to recover only the last error occurring in particular subsequent to an interruption in service. However, the man skilled in the art may, by adding other master blocks, recover previous errors. Furthermore, the inventive system, as disclosed in the embodiment above, cannot be used to recover a plurality of errors affecting a plurality of different data blocks. However, there too, the man skilled in the art may, by adding, in the master blocks, additional authentication code Auth_B fields, proceed to recover data affected by errors in a plurality of data blocks.

Finally, the inventive system combines the three following properties of resistance to unwanted changes and playback and automatic recovery in the event of a breakdown.

The invention claimed is:

1. A system for making data secure, comprising:
a monotonic counter configured to store an encrypted current value of the monotonic counter ($v_c$);
a hardware processor;
a physical data medium comprising:
   at least one data block written on the physical data medium,
   a first master block comprising a value equal to the value of the monotonic counter plus 1 ($v_{c+1}$), an identifier of a last data block of the at least one data block written on said physical data medium, a first authentication code guaranteeing an authenticity of the at least one data block written on the physical data medium, a second authentication code calculated from the last data block written on the physical data medium, said last data block written on the physical data medium being fixed at a pre-specified value, and a third authentication code guaranteeing the authenticity of the first master block, and
   a second master block forming a replica of the first master block, wherein the at least one data block, the first master block and the second master block are contiguous to one another on the physical data medium; and
an authentication key.

2. The system as claimed in claim 1, wherein a size of the at least one data block is configurable.

3. The system as claimed in claim 1 wherein the first authentication code further guarantees an integrity of the at least one data block written on written on said physical data medium and the third authentication code further guarantees the integrity of at least one of the first and second master blocks.

4. The system as claimed in claim 1, wherein the second authentication code is calculated from the last data block written on the physical data medium, data in this last block being fixed at a pre-specified value, and from data in other data blocks of the at least one data block, which is saved as is.

5. The system as claimed in claim 1 wherein the authentication key is contained in the first and the second master blocks.

6. The system as claimed in claim 5 further comprising a system key and wherein the authentication key is encrypted by said system key.

7. The system as claimed in claim 1, wherein the at least one data block is encrypted by an encryption key.

8. The system as claimed in claim 7, wherein the encryption key is encrypted by a system key.

9. The system of claim 1, wherein the pre-specified value is a sequence of zeros.

10. A method for making data secure implemented in a system for making data secure, comprising the following steps of:
   providing a monotonic counter, a hardware processor, a physical data medium and an authentication key, the monotonic counter being configured to store a current value of the monotonic counter ($v_c$);
   the hardware processor writing, on said physical data medium, at least one data block;
   the hardware processor retrieving the current value of the monotonic counter ($v_c$);
   the hardware processor generating a first master block comprising a value equal to the current value of the monotonic counter plus 1 ($v_{c+1}$), an identifier of a last data block of the plurality of data blocks written on said physical data medium, a first authentication code guaranteeing an authenticity of the at least one data block written on the physical data medium, a second authentication code calculated from the last data block written on the physical data medium, said last data block written on the physical data medium being fixed at a pre-specified value, and a third authentication code guaranteeing the authenticity of the first master block, and of a second master block forming a replica of the first master block, wherein the at least one data block, the first master block and the second master block are contiguous to one another on the physical data medium;
   the hardware processor incrementing the monotonic counter to equal $v_{c+1}$ after the first master block has been generated; and
   the hardware processor writing the first master block on the physical data medium.

11. The method as claimed in claim 10, wherein a coherence of the system is verified when the system is started up.

12. The method as claimed in claim 11, wherein, to verify the coherence of the system, a legality of a format of the first master block is verified and, on a condition that said first master block is verified to be unlawful, the legality of the second master block is verified in knowledge that, on a condition that the format of the second master block is verified to be lawful, the first master block is replaced by the second master block and, on a condition that the format of the second master block is verified to be unlawful, the system is deemed to be permanently corrupted.

13. The method as claimed in claim 11, wherein, to verify the coherence of the system, the third authentication code is verified and then, on a condition that said third authentication code is successfully verified, the first authentication code is verified, in knowledge that, on a condition that the verification of the third authentication cod fails, a procedure for recovering the first master block is triggered and, if the verification of the first authentication code fails, a data recovery procedure is triggered.

14. The method as claimed in claim 10 wherein, to write new data, a legality of a format of the first master block is verified and then the third authentication code is verified.

15. The method as claimed in claim 10 wherein, to write new data, a new first master block is generated, the monotonic counter is incremented, the new first master block is written, the new second master block is written and then the new data is written.

16. The method as claimed in claim 15, wherein, to generate the new first master block, an identifier of the last data block written on the physical data medium is updated, a current value of the monotonic counter is recovered, the current value of the monotonic counter plus 1 of the monotonic counter is noted in the new first master block, and then the first, second and third authentication codes are calculated based at least on the updated identifier of the last data block written on the physical data medium and the count value of the monotonic counter plus 1 of the monotonic counter that is noted in the new first master block.

17. The method as claimed in claim 10, wherein, to read data, a legality of the first master block is verified and then the third authentication code is verified.

18. The method as claimed in claim 10, further comprising a data recovery step, said data recovery step being performed automatically, without the system being rebooted.

19. The method as claimed in claim 10 further comprising a step for automatically recovering a master block.

20. The method as claimed in claim 19, wherein, to recover a master block, a current value of the monotonic counter is recovered, and if a value of the monotonic counter indicated in the master block is equal to the current value of the monotonic counter value plus 1, the third authentication code is verified assuming that the value of the monotonic counter is equal to the current value plus 1.

21. The method as claimed in claim 20, wherein, on a condition that verification is completed successfully, the value of the monotonic counter is incremented whereas on a condition that verification fails, the authentication code of the second master block is verified.

22. The method as claimed in claim 10 further comprising the following successive steps:
   writing the second master block; and
   writing the last data block.

23. The method as claimed in claim 9 wherein the computational entity performs data block MAC computations, at least one of said data blocks being encrypted.

24. The method of claim 10, wherein the pre-specified value is a sequence of zeros.

* * * * *